United States Patent
Bartoli

(10) Patent No.: US 10,029,271 B2
(45) Date of Patent: Jul. 24, 2018

(54) WHEEL ARMOR SPRAY PROTECTOR

(71) Applicant: Samuel Bartoli, Monovia, CA (US)

(72) Inventor: Samuel Bartoli, Monovia, CA (US)

( * ) Notice: Subject to any disclaimer, the term of this patent is extended or adjusted under 35 U.S.C. 154(b) by 0 days.

(21) Appl. No.: 14/622,775

(22) Filed: May 8, 2015

(65) Prior Publication Data

US 2015/0238990 A1     Aug. 27, 2015

Related U.S. Application Data

(60) Provisional application No. 61/940,356, filed on Feb. 14, 2014.

(51) Int. Cl.
*B05B 15/04* (2006.01)
*B05B 12/30* (2018.01)
*B60S 3/04* (2006.01)

(52) U.S. Cl.
CPC .......... *B05B 15/0487* (2013.01); *B05B 12/30* (2018.02); *B60S 3/042* (2013.01)

(58) Field of Classification Search
CPC ... B05B 15/04; B05B 15/045; B05B 15/0456; B05B 15/0481; B05B 15/0487; B05B 12/30; B60S 3/04; B60S 3/042
USPC ........................................ 301/37.103, 37.104
See application file for complete search history.

(56) References Cited

U.S. PATENT DOCUMENTS

| | | | | |
|---|---|---|---|---|
| 6,068,345 A * | 5/2000 | Bressie | .................. | B05B 12/30 301/37.103 |
| 6,227,623 B1 * | 5/2001 | Bellow | .................. | B05B 12/30 301/37.42 |
| 6,685,276 B2 * | 2/2004 | Kenion | .................... | B60B 7/01 160/370.21 |
| 8,496,300 B2 * | 7/2013 | Nebel | ...................... | B60B 7/02 301/37.103 |
| 8,556,351 B1 * | 10/2013 | Uhlin | ...................... | B60B 7/04 301/37.104 |

* cited by examiner

*Primary Examiner* — John D Walters
(74) *Attorney, Agent, or Firm* — Ruth Eure

(57) ABSTRACT

A kit containing four round, convex, flexible protective covers to shield tire rims from harsh solvents and chemicals used when cleaning and polishing tires, and four drop cloths is provided. Each cover comprises on its outer edge an extended lip and loops for use in easily handling the cover when applying the cover and removing it from the tire rim.

10 Claims, 4 Drawing Sheets

WHEEL ARMOR SPRAY PROTECTOR

CLAIM OF PRIORITY

This patent application claims priority under 35 USC 119 (e) (1) from U.S. Provisional Patent Application Ser. No. 61/940,356 filed Feb. 14, 2014, of common inventorship herewith entitled, "WASP—Wheel Armor Spray Protector," which is incorporated herein by reference as though the same were set forth in its entirety.

FIELD OF THE INVENTION

The present invention pertains to the field of vehicular cleaning accessories, and more specifically to the field of wheel protective covers.

BACKGROUND OF THE INVENTION

The prior art has put forth several designs for wheel protective covers. Among these are:

US Patent 2012/0274125 to Stephan Waldt describes a power wash and overspray wheel protector composed of a planar material having at least one hand hold opening and a plurality of indicia disposed on at least one surface of the planar material. The plurality of indicia represents a plurality of diameters for allowing a user to adjust the size of the protector to a desired diameter for use to protect a wheel from overspray.

US Patent to 2007/0085412 to Gary Saulnier describes a concave, convex disk for covering a vehicle wheel rim to protect the wheel rim from fluid application that may stain or corrode the wheel rim during detailing of the tires. The Wheel rim protector has a pair of crossed ribs forming a cruciform handle to provide a grip for the user, and may have a lower lip for engagement with the wheel rim when the user presses the disk against the wheel rim. The contour of the disk permits multiple wheel rim protectors to be stacked together during transport, display or storage, and accommodates dust caps or ornamentation projecting from the wheel hub.

US Patent to U.S. Pat. No. 4,811,991 to Ernie A. Moreno and Ray D. Moreno describes a tire rim protector for masking the tire rim while applying a liquid protectant to the rubber portion of the tire. The protector has a handle for maneuvering and maintaining it in place while applying the protectant. A holder for a protectant applicator is included on the outer surface of the protector, and a protectant applicator is included within the holder.

None of these prior art references describe the present invention.

SUMMARY OF THE INVENTION

It is an object of the present invention to provide a set of four protective coverings which function to shield tire rims from harsh solvents and chemicals used when cleaning and polishing the tires.

DETAILED DESCRIPTION OF THE INVENTION

Figure 1:
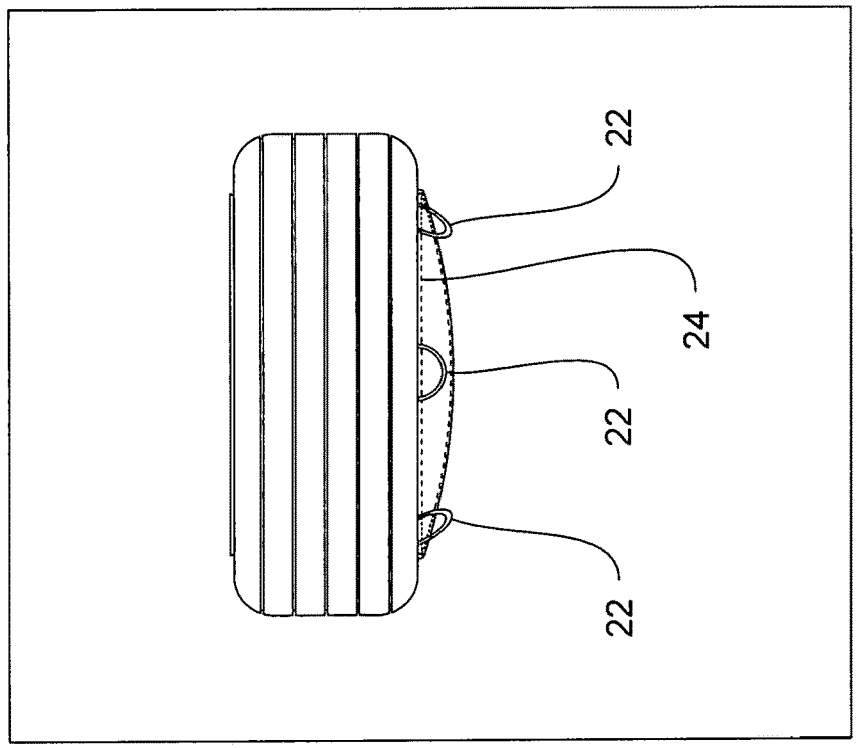
FIG. 1 is an illustrative functional front view of a tire showing how the present invention's plastic shield in place on a tire rim.

Countless car owners enjoy an interest in customizing their automobiles. Whether ordering personalized license plates, attaching fancy mud flaps to rear tires, installing floating neon lights along a car's undercarriage or airbrushing elaborate designs upon a car's hood and trunk, customizing one's vehicle is truly an exciting and artistic way in which to express one self. An extremely popular way in which people revamp the overall appearance of their cars, trucks and vans, is by installing a new set of tires. Produced in a variety of styles such as mag wheels, low profile, whitewashed and modular, a new set of tires vastly improves the appearance of any auto. Although most car enthusiasts agree that tires are a crucial element to the overall design of an automobile, it is common knowledge that a set of high polished rims add a perfect finishing touch. Like tires, rims are produced in a wide variety of styles and materials. Competitive companies are continually developing new and unique varieties of rims to entice the car enthusiast. Whether shiny chrome, gold plated or polished aluminum, rims provide an attractive accessory that all automobile aficionados recognize as an important design element.

Although clean and polished rims are an attractive component of any automobile, caring for rims properly is challenging. Many consumers find that solvents and cleansers used to detail a car tire leave unattractive, and sometimes permanent, stains and residues on the rims. Requiring extra work and extensive scrubbing, these streaks and stains are a costly nuisance. With a set of rims costing anywhere between a few hundred to several thousand dollars, proper maintenance of these valuable commodities is of utmost importance.

The present invention, hereafter referred to as WASP or Wheel Armor Spray Protector, is a set of four protective coverings with each cover specifically functioning to shield and protect a tire rim while the tire is being cleaned or polished. WASP safeguards rims from harsh solvents, polishes and chemicals which are used to clean tires. Included for use with WASP are four protective ground coverings or drop cloths to keep driveways or garage flooring clean when detailing tires. Each WASP kit contains four rim covers to cover each tire rim, four drop cloths to protect surface areas on which one is working, and two soft cloths for wiping off individual WASP shields following use. A storage case is included with the kit, providing neat storage for all the kit's components.

Please refer to the figures. The wheel armor spray protector 10 comprises circularly shaped shield, thin, flexible cover for the wheel cover of a vehicle. The cover is manufactured with an ultra thin, low density, polyethylene plastic material that naturally conforms to the shape of the rim. The diameter of the cover is stretchable, stretching from approximately one eighth to one half of an inch, to accommodate various sizes of tire rims and thus providing a customizable fit during use. WASP gently stretches to accommodate slight differentiations in individual tire rims and securely adheres to the rim on which it is applied, regardless of size.

Figure 3:
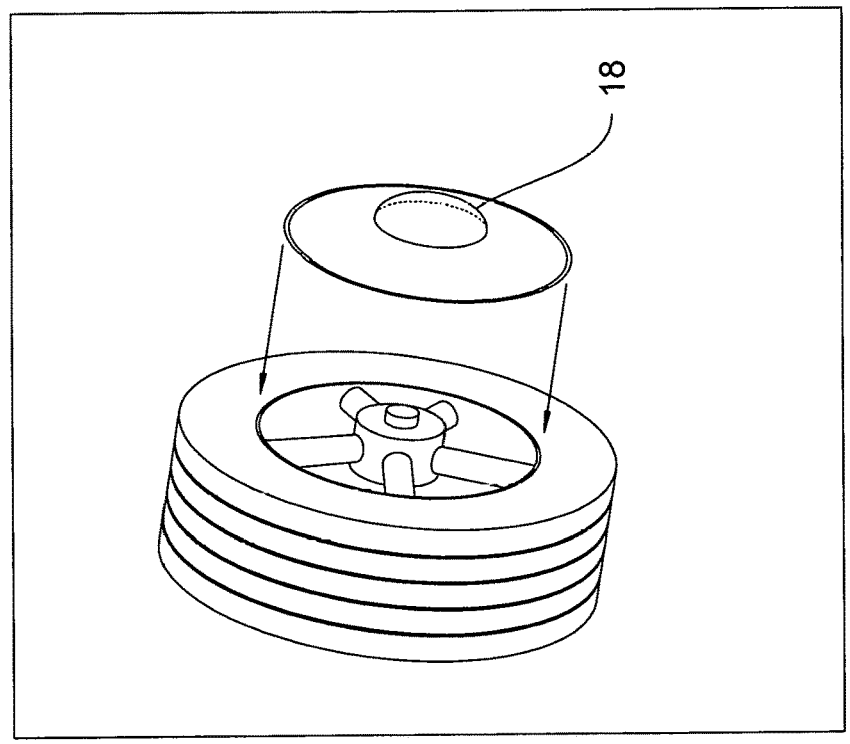
FIG. 3 is an illustrative perspective view of a tire with the present invention's plastic shield installed on a tire turned rim side down to ground, showing pull tabs that reside on the present invention.

The present invention is produced in a range of diameters from approximately fifteen to twenty four inches, accommodating smaller tires on automobiles to larger tires on SUVs, trucks, campers and motor homes. WASPs for heavy duty and four wheel drive motor vehicles contain an outward protrusion 18 in the plastic shield's center to receive or accommodate the wheel rim's axle joint protrusion, shown in FIGS. 3 and 6.

Figure 2:
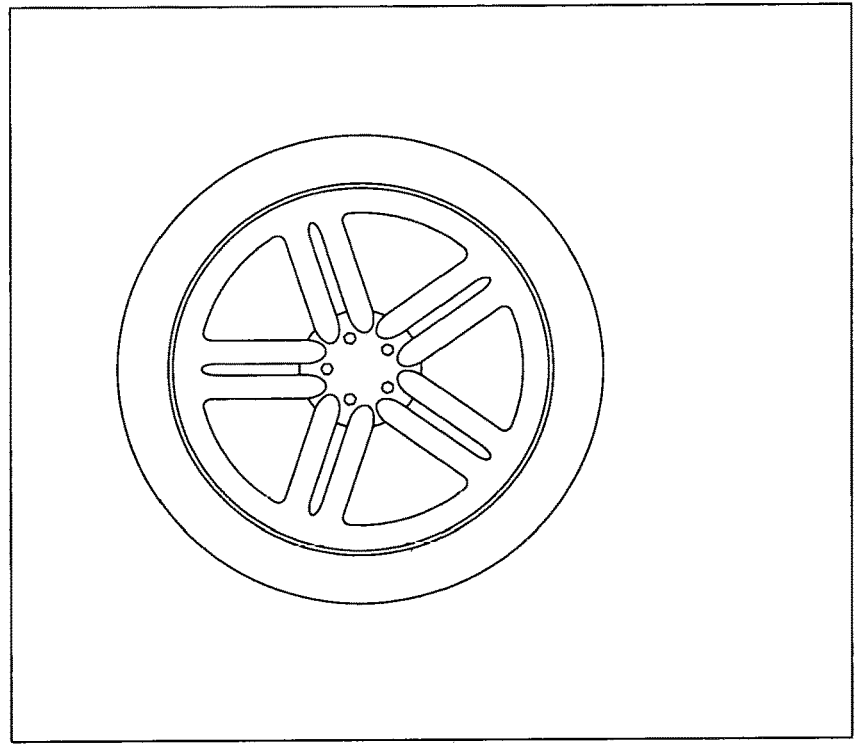
FIG. 2 is an illustrative functional side view showing how the present invention's plastic shield snaps on to a tire rim.
Figure 4:
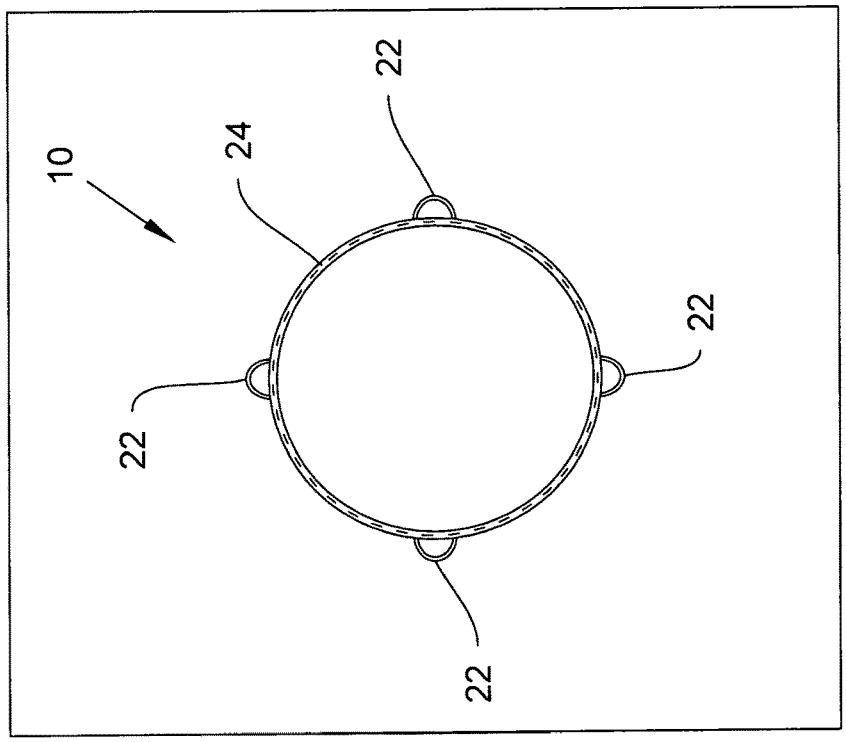
FIG. 4 is an illustrative functional diagonal view showing an alternative embodiment that contains a plastic shield with an outward protrusion to accommodate rims on heavy duty pickup trucks.
Figure 6:
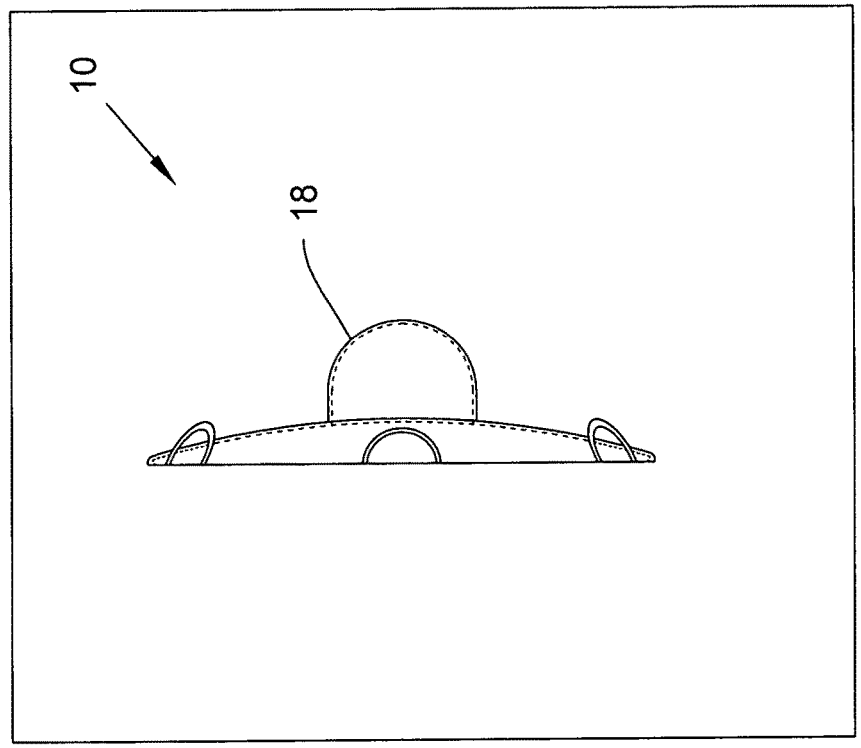
FIG. 6 is a functional side view showing the plastic shield wheel protector of the present invention for a pick up truck or other 4 wheel drive vehicle having protuberant hubs showing the pull tabs along the outer edge of the cover for removing the cover from the vehicle.
Figure 5:
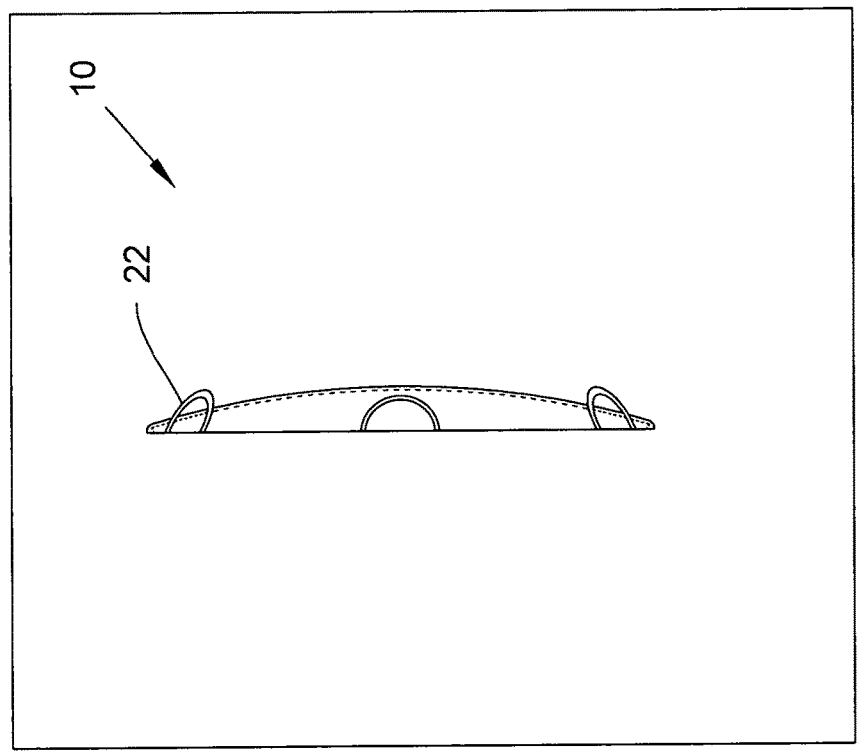
FIG. 5 is a functional side view showing the plastic shield wheel protector of the present invention for a passenger car showing the pull tabs along the outer edge of the cover for removing the cover from the vehicle.

Circular and convex in shape, shown in FIGS. 2, 5 and 6, Wheel Armor Spray Protector contains a series of three or four semi circularly shaped loops 22 spaced evenly around the perimeter of the device for use in easily handling the cover when applying and removing it from the tire rim. Running the perimeter of the underside of the unit is an extended lip 24 that gently stretches over the outer edge of the rim, securing the device in place in a similar manner as applying a lid to a plastic food storage container. FIGS. 5 and 6 do not show the extended lip 24. To prevent fluids from leaking beneath the cover during use, the convex shape creates a gentle taper along the outer edge of the WASP, to help provide an impenetrable and waterproof seal when extended lip 24 is stretched over the rim.

Figure 7:
FIG. 7 is an exaggerated cross-sectional side view showing extended lip which stretches over the outer edge of the tire rim.

FIG. 7 shows one embodiment of extended lip 24 wherein the lip comprises a horizontal extension extending from the outer edge of the cover.

Figure 8:
FIG. 8 is an alternative geometric configuration for an exaggerated cross-sectional side view of extended lip.

FIG. 8 shows an alternative embodiment of extended lip 24 wherein lip 24 comprises a horizontal extension and small vertical notch 26 to accommodate a protruding edge of a tire rim.

Four durable drop cloths, not shown, are included with Wheel Armor Spray Protector when cleaning the tires. Generally rectangular in shape, these drop cloths are manufactured from a heavy duty vinyl material and are sized appropriately to encompass the immediate area surrounding the base of the tire. Each drop cloth contains an integrated and recessed niche to accommodate the tire, encircling the front and each end of the tire during use. Two soft cloths also are included in the WASP kit for use in easily cleaning individual WASP shields after the task of detailing one's tires was complete.

Using Wheel Armor Spray Protector is very simple and straight forward. First, the user purchases a WASP kit in a size appropriate for their car's tires and rims. Next, the user places each individual WASP plastic shield directly over each tire rim, adhering the shield in place by stretching and snapping lip 24 that runs the perimeter of the shield over an outer edge of the tire rim. The form fitting Wheel Armor Spray Protector shield encompasses the surface of the rim completely, while its lip 24 provides an impenetrable barrier between the rim and solvents used to clean the tire. With all four Wheel Armor Spray Protectors applied to the individual tire rims, the user then places included drop cloths on the floor directly in front of each tire. Each drop cloth covers flooring or ground in front of and on both sides of the tire. With the rim shields and drop cloths properly applied, the user begins detailing the tires. Scrubbing the tires with warm soapy water, chemical solutions or solvents, the user uses a small stiff brush to clean the tire side walls. After the tires are clean and have dried thoroughly, the user applies a spray on or liquid tire dressing. Once the dressing has dried completely, the user removes each individual WASP shield by pulling on loops 22. The individual shields and drop cloths are wiped clean of any errant solvents with included soft cloths. The user then returns the components of the Wheel Armor Spray Protector to its handy storage case, storing the kit away until again needed.

Manufactured of a flexible polyethylene plastic material, the Wheel Armor Spray Protector easily expands and contracts to accommodate slight differentiations in individual rim sizes, providing a truly secure and customized fit. Snapping over the tire rim and secured in place with a fitted lip, the WASP provides a reliable barrier between the rim and those solvents used to clean the tire. Using the WASP eliminates unattractive streaks, stains and marks associated with detailing solvents and helps extend the functional life of the tire rim.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A protective cover to shield a tire rim from solvents and chemicals used when cleaning and polishing tires, comprising:
   a circularly shaped convex, flexible shield cover capable of covering the tire rim, and
   three or four semi circularly shaped loops spaced evenly around a perimeter of the cover for use in easily handling the cover when applying the cover and removing it from the tire rim.

2. The protective cover of claim 1, manufactured from a polyethylene plastic material that naturally conforms to the shape of the tire rim.

3. The protective cover of claim 2, wherein a diameter of the cover is stretchable, stretching from approximately one eighth to one half of an inch, to accommodate various sizes of tire rims and thus providing a customizable fit during use.

4. The protective cover of claim 2, produced in a range of diameters from approximately fifteen inches to approximately twenty four inches, to accommodate smaller tires on automobiles to larger tires on SUVs, trucks, campers and motor homes.

5. The protective cover of claim 2, further comprising an outward protrusion in a center of the cover to receive or accommodate a wheel rims axle joint protrusion.

6. The protective cover of claim 1, further comprising an extended lip that runs along the perimeter of the underside of the cover, wherein the lip is capable of stretching over an outer edge of the tire rim.

7. The protective cover of claim 6, wherein the extended lip extends horizontally from the outer edge of the cover.

8. The protective cover of claim 7, wherein the extended lip further comprises a vertical notch to accommodate a protruding edge of the tire rim.

9. A kit containing four protective covers to shield tire rims from solvents and chemicals used when cleaning and polishing tires, wherein each cover comprises a circularly shaped convex, flexible shield cover capable of covering the tire rim; the cover further comprising three or four semi circularly shaped loops spaced evenly around a perimeter of the cover for use in easily handling the cover when applying the cover and removing it from the tire rim; the cover further comprising an extended lip that runs along the perimeter of an underside of the cover, wherein the lip is capable of stretching over an outer edge of the tire rim.

10. The kit of claim 9, each cover further comprising an outward protrusion in the center of the cover to receive or accommodate a wheel rim's axle joint protrusion.

\* \* \* \* \*